(12) United States Patent
Trimmer et al.

(10) Patent No.: US 7,741,576 B2
(45) Date of Patent: Jun. 22, 2010

(54) APPARATUS AND METHOD FOR HYBRID MACHINING A WORKPIECE

(75) Inventors: Andrew Lee Trimmer, Latham, NY (US); Bin Wei, Mechanicville, NY (US); Michael Scott Lamphere, Hooksett, NH (US)

(73) Assignee: General Electric Company, Niskayuna, NY (US)

( * ) Notice: Subject to any disclaimer, the term of this patent is extended or adjusted under 35 U.S.C. 154(b) by 308 days.

(21) Appl. No.: 11/747,281

(22) Filed: May 11, 2007

(65) Prior Publication Data

US 2008/0277384 A1   Nov. 13, 2008

(51) Int. Cl.
*B23H 5/00* (2006.01)
*B23H 5/02* (2006.01)
*B23H 5/04* (2006.01)
*B23H 5/06* (2006.01)
*B23H 9/10* (2006.01)

(52) U.S. Cl. .............................. 219/69.17; 204/224 M; 205/662; 205/663; 219/69.2

(58) Field of Classification Search .............. 219/69.17, 219/69.2; 205/662, 663; 204/224 M
See application file for complete search history.

(56) References Cited

U.S. PATENT DOCUMENTS

| | | | | |
|---|---|---|---|---|
| 3,417,006 A | * | 12/1968 | Inoue | 219/69.17 |
| 3,816,693 A | * | 6/1974 | Braun | 219/69.2 |
| 4,134,807 A | * | 1/1979 | Briffod | 219/69.17 |
| 4,641,007 A | * | 2/1987 | Lach | 219/69.17 |
| 4,860,616 A | * | 8/1989 | Smith | 219/69.17 |
| 4,992,639 A | * | 2/1991 | Watkins et al. | 219/69.2 |
| 5,071,525 A | * | 12/1991 | Ushiyama | 205/663 |
| 5,091,067 A | * | 2/1992 | Ushiyama et al. | 205/663 |
| 5,108,561 A | * | 4/1992 | Kuromatsu | 205/663 |
| 5,171,408 A |   | 12/1992 | Thornton | |
| 5,688,392 A | * | 11/1997 | White | 219/69.17 |
| 6,200,439 B1 |   | 3/2001 | Wei et al. | |
| 6,267,868 B1 |   | 7/2001 | Wei et al. | |
| 6,562,227 B2 |   | 5/2003 | Lamphere et al. | |
| 6,627,054 B2 |   | 9/2003 | Wei et al. | |
| 6,787,728 B2 |   | 9/2004 | Wei et al. | |
| 6,848,970 B2 | * | 2/2005 | Manens et al. | 451/5 |

(Continued)

FOREIGN PATENT DOCUMENTS

JP   7-204935 A   *   8/1995

(Continued)

*Primary Examiner*—Geoffrey S Evans
(74) *Attorney, Agent, or Firm*—Penny A. Clarke

(57) ABSTRACT

An apparatus and method for hybrid machining a workpiece is disclosed. The apparatus includes a mandrel for supporting the workpiece adjacent a cutter mounted on an arbor. A workpiece is powered as an anode and the cutter is powered as a cathode, and a cutting fluid or coolant is circulated therebetween. The cutter is made of a conductive material and a non-conductive abrasive material to maximize the amount of material removed from the workpiece. The coolant includes one or more additives to enhance the electrical discharge between the cutter and the workpiece. The cutter is moved relative to the workpiece to remove material from the workpiece at a predetermined depth of cut using an enhanced high-speed electro-erosion (HSEE) process in which both HSEE and abrasive machining processes are used. The workpiece may then be finish machined to a final shape of the titanium article, such as a dovetail of a turbine blade.

20 Claims, 4 Drawing Sheets

U.S. PATENT DOCUMENTS

| | | |
|---|---|---|
| 6,858,125 B2 * | 2/2005 | Wei et al. ................. 204/224 M |
| 6,968,290 B2 | 11/2005 | Wei et al. |
| 2003/0077340 A1 | 4/2003 | Rao et al. |
| 2004/0047880 A1 | 3/2004 | De Bolle et al. |
| 2004/0107572 A1 * | 6/2004 | Przybylski et al. ......... 29/889.7 |
| 2004/0124078 A1 * | 7/2004 | Wei et al. .................... 204/212 |
| 2005/0247569 A1 * | 11/2005 | Lamphere et al. ........... 205/663 |
| 2008/0135418 A1 * | 6/2008 | Yuan .......................... 205/686 |

FOREIGN PATENT DOCUMENTS

JP          2004-358585  A   *  12/2004

* cited by examiner

APPARATUS AND METHOD FOR HYBRID MACHINING A WORKPIECE

BACKGROUND

The invention relates generally to machining of an advanced material, and in particular to hybrid machining a titanium article, such as an airfoil of a gas turbine engine.

Today's manufacturing industry is facing challenges from advanced difficult-to-machine materials (tough super alloys, ceramics, and composites), stringent design requirements (high precision, complex shapes, and high surface quality), machine, and machining costs.

Advanced materials play an increasingly important role in modern manufacturing industries, especially, in aircraft, automobile, tool, die and mold making industries. The greatly-improved thermal, chemical, and mechanical properties of the material (such as improved strength, heat resistance, wear resistance, and corrosion resistance), while having yielded enormous economic benefits to manufacturing industries through improved product performance and product design, are making traditional machining processes unable to machine them or unable to machine them economically. This is because traditional machining is most often based on removing material using tools harder than the workpieces.

In addition to the advanced materials, stringent design requirements also pose major problems in manufacturing industry. More and more complex shapes (such as an aerofoil section of a turbine blade, complex cavities in dies and molds, non-circular, small, and curved holes), low rigidity structure, and micromechanical components with tight tolerances and fine surface quality are often needed. Traditional machining is often ineffective in machining these parts. To meet these challenges, new processes have been developed.

Electrical discharge machining (or EDM) is a machining method primarily used for hard metals or those that would be impossible to machine with traditional techniques. One critical limitation, however, is that EDM only works with materials that are electrically conductive. EDM can cut small or odd-shaped angles, intricate contours or cavities in extremely hard steel and exotic metals such as titanium, hastelloy, kovar, inconel and carbide.

Sometimes referred to as spark machining or spark eroding, EDM is a nontraditional method of removing material by a series of rapidly recurring electric arcing discharges between an electrode (the cutting tool) and the work piece, in the presence of an energetic electric field (applied potential). The EDM cutting tool is guided along the desired path very close to the workpiece, but it does not touch the workpiece. Consecutive sparks produce a series of micro-craters on the work piece and remove material along the cutting path by melting and vaporization. The particles are washed away by the continuously flushing dielectric fluid.

Electro Chemical Machining (or ECM) is a method of working extremely hard materials or materials that are difficult to machine cleanly using conventional methods. It is limited, however, to electrically conductive materials. ECM can cut small or odd-shaped angles, intricate contours or cavities in extremely hard steel and exotic metals such as titanium, hastelloy, kovar and inconel.

ECM is similar in concept to EDM in that a high current is passed between an electrode and the part and through an electrolyte. While the applied potential in EDM ranges from 20 to 200V, the applied potential in ECM is lower and ranges from a few mV to about 30V. The ECM cutting tool is guided along the desired path very close to the work but it does not touch the workpiece. Unlike EDM however, no sparks are created. The workpiece is corroded away by the electrochemical reaction occurring at the surface of the workpiece. Very high metal removal rates are possible with ECM, along with no thermal or mechanical stresses being transferred to the part, and mirror surface finishes are possible. The ECM process is most widely used to produce complicated shapes with good surface finish in difficult to machine materials, such as turbine blades. It is also widely used as a deburring process.

Electro Chemical Grinding (or ECG) is a combination of electrochemical (Anodic) dissolution of a material, according to Faraday's Law, and light abrasive action. The metal is decomposed to some degree by the DC current flow between the conductive grinding wheel (Cathode) and the work piece (Anode) in the presence of an electrolyte solution.

Electrochemical oxidation and reduction occurs on the surface of electrodes when an electric current is passed between the electrodes through an electrolyte fluid. An electrochemical potential between the electrodes causes current to flow from the anode to the cathode in the DC circuit. In ECG, the anode is the workpiece, and the cathode is the conductive grinding wheel. A continuous stream of electrolyte flows at the interface of the grinding wheel and work piece and conducts the current in the circuit. The electrolyte fluid is often a conductive aqueous solution consisting of a mixture of chemical salts and other additives. At the positive electrode, or anode, oxidation of the work piece dissolves the surface, and in many cases resulting in the formation of an oxide film. The film is electrically insulating, and acts as a barrier against the electrochemical cutting action of the process.

The abrasives in the rotating grinding wheel continually remove this film and expose a fresh surface for oxidation. Metal deposition on the grinding wheel (cathode) is avoided by proper choice of electrolyte. Dissolution of the metal, combined with the mechanical removal of the oxides, results in an efficient low-stress cut.

Electro Chemical Discharge Machining (or ECDM) using DC or pulse voltage and Electro Chemical Arc Machining (ECAM) using constant or pulse voltage are the combined methods of machining involving ECM and EDM. A combination of ECM with EDM in one process, ECDM in an electrolyte solution has shown to contain the benefits of both processes, provided that the parameters of the combined process are properly selected.

In a high-speed electro-erosion (HSEE) process, controlled instantaneous short circuits between the electrodes are utilized for high speed metal erosion and improved tolerance control. Due to the effect of electrical erosions on the machining surface, a large number of craters are formed on the surface. These surface irregularities are subject to the crater size and density control. It has been shown that the process yields rates of material removal using the HSEE process can be as much as five to fifty times greater than ECM and EDM, respectively.

However, some advanced difficult-to-machine materials, such as titanium and titanium alloys, and stringent design requirements still pose major problems in the manufacturing industry. Titanium remains difficult to machine by HSEE due to lower thermal conductivity and inconsistent molten chip ejection during cutting as compared to machining other alloys, such as nickel-based alloys and the like. To meet these challenges, innovative techniques or modifications of the existing methods is needed.

BRIEF DESCRIPTION

Briefly, an electro machining apparatus for hybrid machining a workpiece comprises a mandrel for supporting the workpiece; a cutter mounted on an arbor, the cutter made of an electrically conductive material and having a non-conductive abrasive material; a power supply for providing electrical power to the workpiece and the cutter; a coolant supply for circulating a coolant between the cutter and the workpiece, the coolant containing means for increasing plasma discharge between the workpiece and the cutter; and means for moving the cutter relative to the workpiece to remove material from the workpiece, wherein the material is removed from the workpiece using a high-speed electro-erosion (HSEE) process enhanced by mechanical abrasion.

In another aspect of the invention, a method of hybrid machining a workpiece, comprising the steps of:

rotating a cutter, the cutter made of an electrically conductive material and having a non-conductive abrasive material;

electrically powering a workpiece made of a titanium alloy and the cutter;

circulating a coolant therebetween, the coolant containing one or more additives for increasing plasma discharge between the workpiece and the cutter;

positioning the workpiece relative to the cutter at a predetermined depth of cut; and moving the cutter relative to the workpiece to remove material from the workpiece, whereby the material is removed from the workpiece using a high-speed electro-erosion (HSEE) process enhanced by mechanical abrasion.

In yet another aspect of the invention, a method of hybrid machining a workpiece, comprising the steps of:

rotating a cutter made of an electrically conductive material and having a non-conductive abrasive material;

electrically powering a dovetail blank of a turbine blade and the cutter;

circulating a coolant between the dovetail blank and the cutter, the coolant containing one or more additives for increasing plasma discharge between the dovetail blank and the cutter;

positioning the dovetail blank relative to the cutter at a first predetermined depth of cut; and moving the cutter relative to the dovetail blank to remove material from sidewalls of the dovetail blank by using an enhanced high-speed electro-erosion (HSEE) process.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
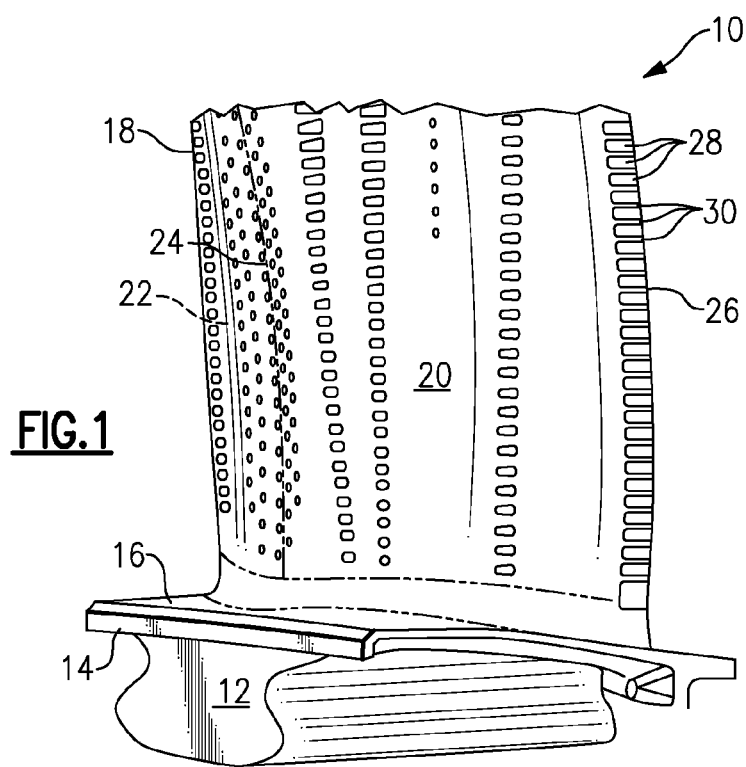
FIG. 1 is a perspective view of a turbine blade with a dovetail formed by using the electromachining apparatus and method in accordance with an embodiment of the invention.

Referring to the drawings wherein identical reference numerals denote the same elements throughout the various views, FIG. 1 illustrates an exemplary turbine blade 10. The turbine blade 10 includes a dovetail 12, which may have any suitable form including tangs that engage complementary tangs of a dovetail slot in a rotor disk (not shown) for radially retaining the blade 10 to the disk as it rotates during operation. A blade shank 14 extends radially upwardly from the dovetail 12 and terminates in a platform 16 that projects laterally outwardly from and surrounds the shank 14. A hollow or solid airfoil 18 extends radially outwardly from the platform 16 and into the hot gas stream. The airfoil 18 has a concave pressure side wall 20 and a convex suction side wall 22 joined together at a leading edge 24 and at a trailing edge 26. The airfoil 18 may take any configuration suitable for extracting energy from the hot gas stream and causing rotation of the rotor disk. The blade 10 is preferably formed as a one-piece casting or forging of a suitable superalloy, such as a nickel-based superalloy, which has acceptable strength at the elevated temperatures of operation in a gas turbine engine. For example, the superalloy may comprise a titanium alloy, such as Ti-64, Ti-6242, and the like. The blade can incorporate a number of trailing edge bleed slots 28 on the pressure side 20 of the airfoil. The bleed slots 28 are separated by a number of longitudinally extending lands 30. The bleed slots 28 and lands 30 are not necessary to practice the principles of the invention. At least a portion of the airfoil 18 may be coated with a protective coating (not shown), such as an environmentally resistant coating, or a thermal barrier coating, or both.

Figure 2:
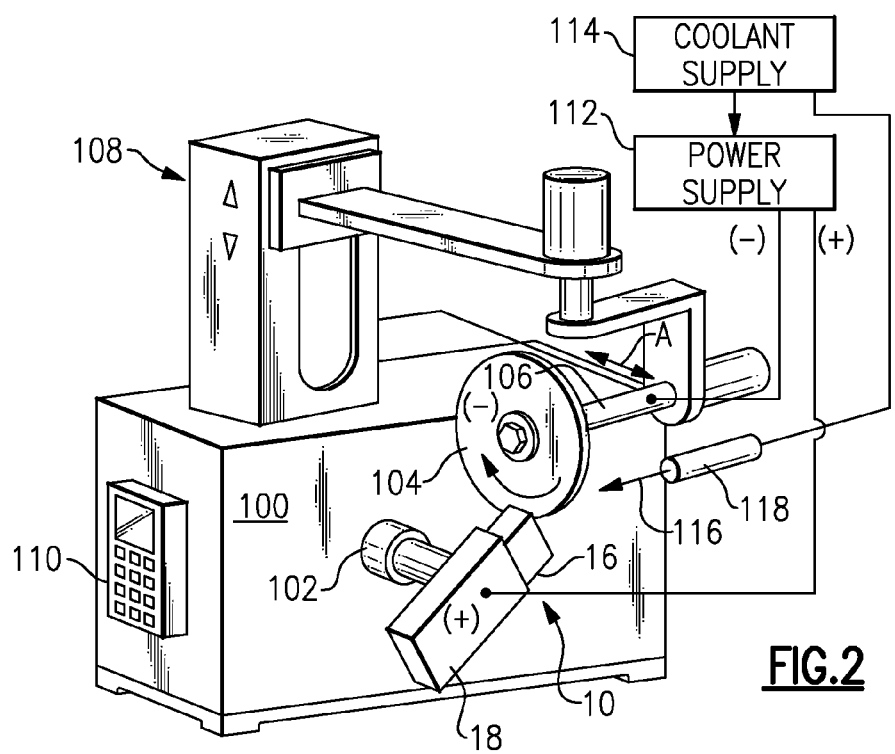
FIG. 2 is a schematic representation of an electromachining apparatus for hybrid machining a workpiece, such as a turbine blade, in accordance with an embodiment of the invention.

Referring now to FIG. 2, an electromachining apparatus or a hybrid machine 100 is configured for both roughing pass and finish machining of a workpiece, such as the turbine blade 10, by using an enhanced high-speed electro-erosion (HSEE) process in which a hybrid electromachining process uses both mechanical abrasion and electrochemical dissolution processes. One application of the electromachining apparatus or hybrid machine 100 is to form, for example, the dovetail 14 of the turbine blade 10.

The hybrid machine 100 includes a supporting shaft or mandrel 102 upon which the workpiece, such as the turbine blade 10, is securely mounted and supported therewith. An annular cutting wheel or cutter 104 is fixedly mounted on a rotary shaft or arbor 106 for rotation therewith during operation. A multi-axis carriage 108 is suitably configured for supporting the arbor 106 and the cutter 104 and provides driving means for moving the rotating cutter 104 relative to the turbine blade 10 along the horizontal axis, A, during operation. Both the carriage 108 and the mandrel motor (not shown) are operatively joined to a digitally programmable controller 110 that is specifically configured in suitable software for controlling all operation of the electromachining apparatus or hybrid machine 100. In an exemplary embodiment, the linear speed of the rotating cutter 104 is in the range between about 3 inches per minute to about 50 inches per minute, and more preferably in the range from about 15 inches per minute to about 20 inches per minute. It will be appreciated that the invention is not limited by the linear speed of the rotating cutter, and that the rate of material removal from the workpiece may be maximized, while achieving a correspondingly rough surface finish for the machined workpiece.

Multi-axis machine tools or CNC machine tools are commonly available and may be modified for introducing the desired linear motion of the rotating cutter 104 relative to the turbine blade 10. Although the turbine blade 10 is held stationary as the rotating cutter 104 is suitably moved relative thereto, the turbine blade 10 may also be suitably moved relative to the cutter 104.

In an exemplary embodiment, the cutter 104 is made of an electrically conductive material, such as copper, with a non-conductive abrasive material, such as alumina, ceramic, diamond, and the like, homogeneously dispersed therein. The grit range of the cutter 104 is in the range from about 60 grit to about 340 grit, and more preferably in the range from about 80 grit to about 200 grit, and most preferably about 100 grit.

A suitable power supply 112, either DC constant or DC pulsed, provides means for powering or providing electrical power to the turbine blade 10 and the cutter 104 during operation. The electrical power supply 112 includes a first negative (−) lead electrically joined to the cutter 104 in any suitable manner, such as by using a slip ring attached to an electrically conducting arbor. A second positive (+) lead electrically joins the power supply 112 to the turbine blade 10 in any suitable manner, such as by using another slip ring with an electrically conducting mandrel, or by direct attachment to the turbine blade 10.

Because the cutter 104 is powered as a cathode (−) and the turbine blade 10 is powered as an anode (+) in the hybrid electromachining process, the differential electrical potential therebetween may be used for rapidly electrically eroding material from the turbine blade 10 at the interface with the cutter 104 for rapidly removing material from the turbine blade 10. Although the invention is not limited by a specific voltage, in an embodiment, the DC voltages are in the range between about 8 volts to about 22 volts, and most preferably about 14 volts.

In order to maximize material removal by the rotating cutter 104, the cutter 104 may be made as wide as practical for one-pass cutting to minimize the need for additional passes or material removal from the turbine blade 10. Accordingly, the cutter 104 illustrated in FIG. 1 is in the form of a disk having a top surface 104a, a bottom surface 104b, and a perimeter rim, shown generally at 104c. The rim 104c has a profile that will generally form the profile of the turbine blade 10 after rough machining of the turbine blade 10.

During the hybrid electromachining process, considerable heat is generated by the electrical erosion, and the cutter 104 may be rotated at a suitable speed by a corresponding motor (not shown) contained in the carriage 108 for distributing the heat load around the perimeter of the cutter 104 during operation. To minimize heat buildup, a coolant supply 114, including a discharge nozzle 42b, provides means for discharging a cutting fluid or liquid coolant 116 at the cutting interface between the cutter 104 and the turbine blade 10 during operation. In an exemplary embodiment, the coolant 116 is pumped through the nozzle 118 and directed into the gap between the rotating cutter 104 and the turbine blade 10 at a pressure in the range between about 10 pounds per square inch to about 400 pounds per square inch, and more preferably in the range between about 100 pounds per square inch to about 300 pounds per square inch, and most preferably about 220 pounds per square inch. The cutting fluid or coolant 116 performs the additional tasks of flushing debris from the cutting interface, while cooling both the turbine blade 10 and the cutter 104.

In an exemplary embodiment, the cutting fluid or coolant 116 contains one or more additives or other means for increasing the conductivity of the coolant 116. For example, the coolant 116 may contain a halide salt, sodium bromide, and the like. In one embodiment, the coolant 116 contains about 4-20% by weight of sodium bromide to increase the plasma discharge (arcing) between the turbine blade 10 and the cutter 104. For example, the coolant 116 may contain about 5.6% by weight of sodium bromide. The coolant 116 may also contain a pump conditioner additive, one or more anti-rust agents, and the like. However, it will be appreciated that the invention is not limited by the additives in the coolant, and that any suitable coolant may be used that will improve plasma discharge.

In some embodiments, the cutting zone may be fully immersed into the coolant 116 to provide superior heat dissipation and help ensure the entire cutting zone has coolant available. Immersion will contain and cool the removed debris. When the cutting zone is fully immersed, the machining process may be used with or without additional directed flushing of the cutting zone by the nozzle 118.

Figure 3:
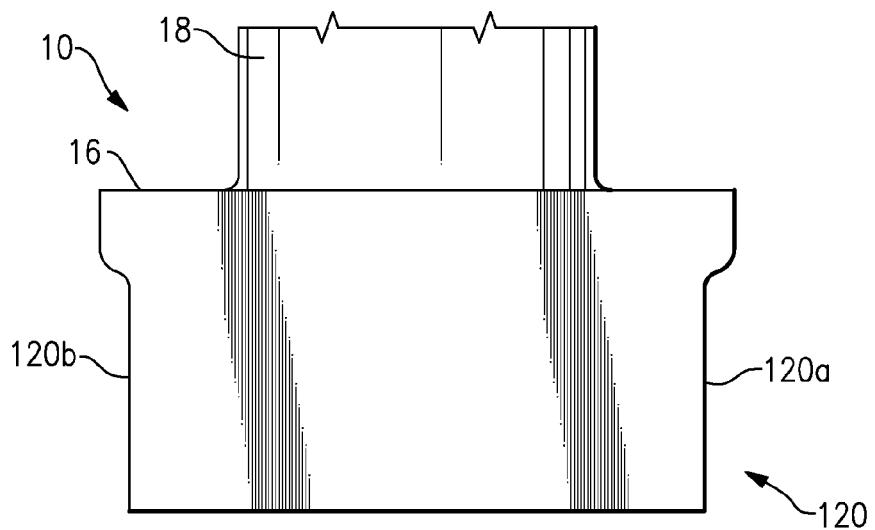
FIG. 3 is a side view of a turbine blade with a dovetail blank prior to being machined by the electromachining apparatus of FIG. 2 in accordance with the invention.

A method of forming the dovetail 12 of the turbine blade 10 using the hybrid apparatus 100 in accordance with an embodiment of the invention will now be described. First, a turbine blade 10 with a dovetail blank 120, as shown in FIG. 3, is attached to the mandrel 102 of the hybrid apparatus 100. The dovetail blank 120 includes a first sidewall 120a and a second, opposite sidewall 120b, as shown in FIG. 3. The first sidewall 120a of the dovetail blank 120 of the turbine blade 10 is positioned relative to the cutter 104 to produce a desired depth of cut. The turbine blade 10 and the cutter 104 are electrically powered by the power supply, and the coolant 116 is circulated therebetween.

Figure 4:
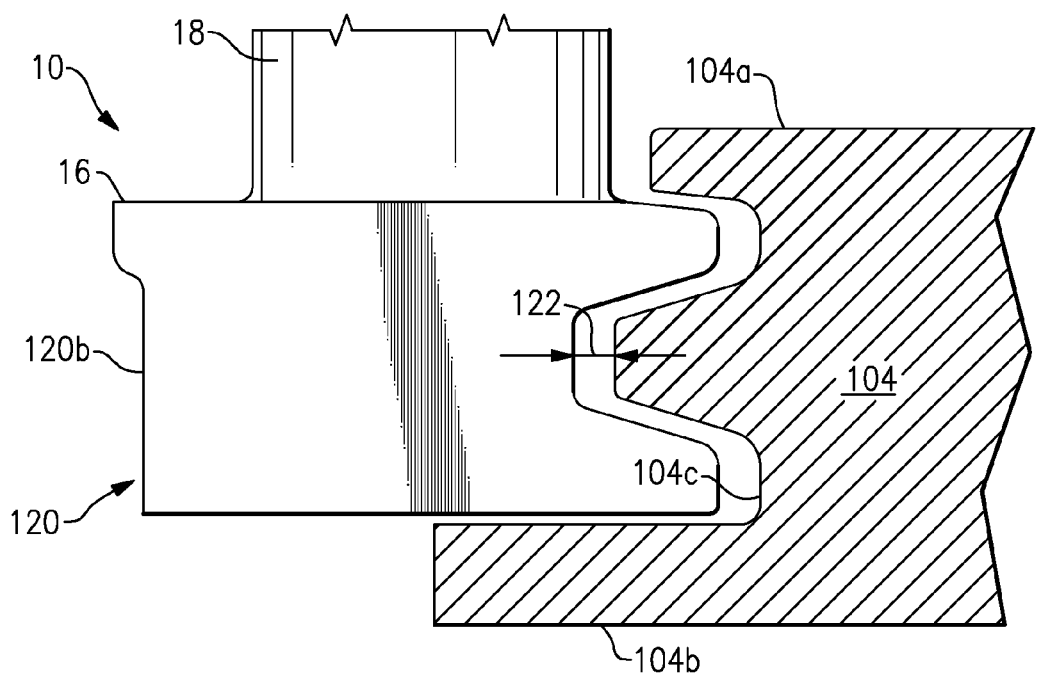
FIG. 4 is a partial cross-sectional side view of the electrode disk or cutter removing material from a sidewall of the dovetail blank by using an enhanced HSEE process in a first roughing pass machining operation.

Then, the rotating cutter 104 is then moved along the horizontal axis, A, to electrically erode or machine the dovetail blank 120 in a first roughing pass machining operation using the hybrid electromachining (HSEE) process to form the desired profile therein, as shown in FIG. 4. The distance of the gap 122 between the cutter 104 and the first sidewall 120a of the turbine blade 10 is dependent upon the desired plasma discharge field (arcing) and the size of the grit particles of the abrasive non-conducting material. For example, 100 grit abrasive particles have a diameter of about 0.005 inches (0.0127 centimeter). In an exemplary embodiment, the distance of the gap 122 is in the range between about 0.005 to 0.009 inches (0.0127 to 0.02286 centimeter).

Figure 5:
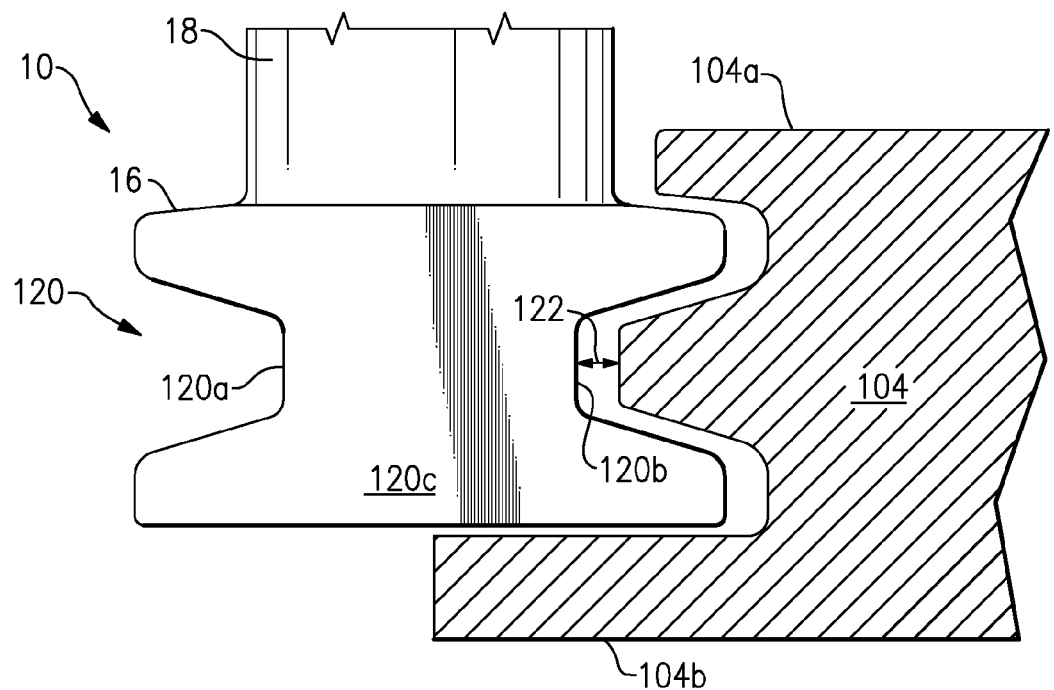
FIG. 5 is a partial cross-sectional side view of the electrode disk or cutter removing material from another sidewall of the dovetail blank by using the enhanced HSEE process in the first roughing pass machining operation.

After the first sidewall 120a is machined, the dovetail blank 120 of the turbine blade 10 is then positioned relative to the cutter 104 to produce a desired depth of cut. The turbine blade 10 and the cutter 104 are electrically powered by the power supply, and the coolant 116 is circulated therebetween. Then, the rotating cutter 104 is then moved along the horizontal axis, A, to electrically erode or machine the dovetail blank 120 using the hybrid electromachining (HSEE) process to form the desired profile therein, as shown in FIG. 5. Once the first and second sidewalls 120a, 120b of the dovetail blank 120 have been machined, the first roughing pass machining operation of the dovetail blank 120 is completed. Additional roughing pass machining operations can be conducted as necessary to provide a rough dovetail shape.

Figure 6:
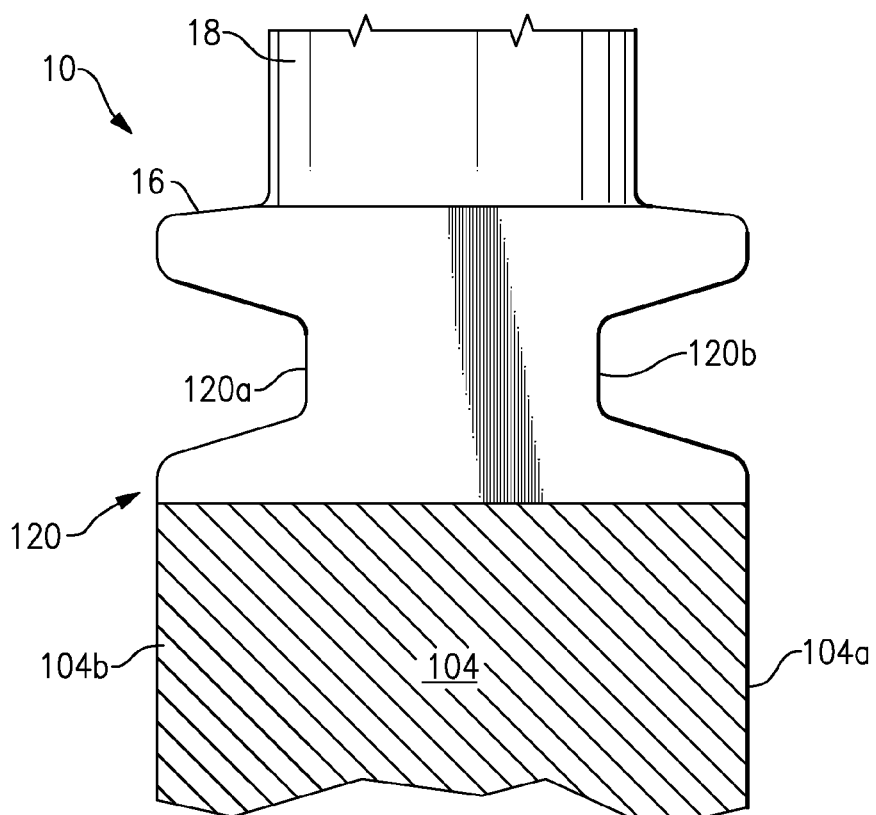
FIG. 6 is a partial cross-sectional side view of the electrode disk or cutter removing material from a lower portion of the dovetail blank by using the enhanced HSEE process in a second roughing pass machining operation.

Next, the dovetail blank 120 of the turbine blade 10 undergoes a second roughing pass machining operation using the hybrid electromachining (HSEE) process, or optionally a conventional grinding or milling process, and the like. In the second roughing pass machining operation, the rim 104c of the cutter 104 has a different profile than the rim 104c of the cutter 104 in the first roughing pass machining operation. Specifically, the profile of the rim 104c of the cutter 104 in the second rough machining is substantially planar, rather than being contoured as in the first rough machining. As seen in FIG. 5, the dovetail blank 120 is formed with a lower portion 120c after completion of the first rough machining. The purpose of the second rough machining using the hybrid electromachining process, or optionally a conventional grinding or milling process, is to remove the lower portion 120c of the dovetail blank 120. To this end, the cutter 104 is positioned relative to the dovetail blank 120 to produce the desired depth of cut to remove the lower portion 120c of the dovetail blank 120, as shown in FIG. 6. Once the lower portion 120c is removed, the second roughing pass machining operation of the dovetail blank 120 is completed.

Figure 7:
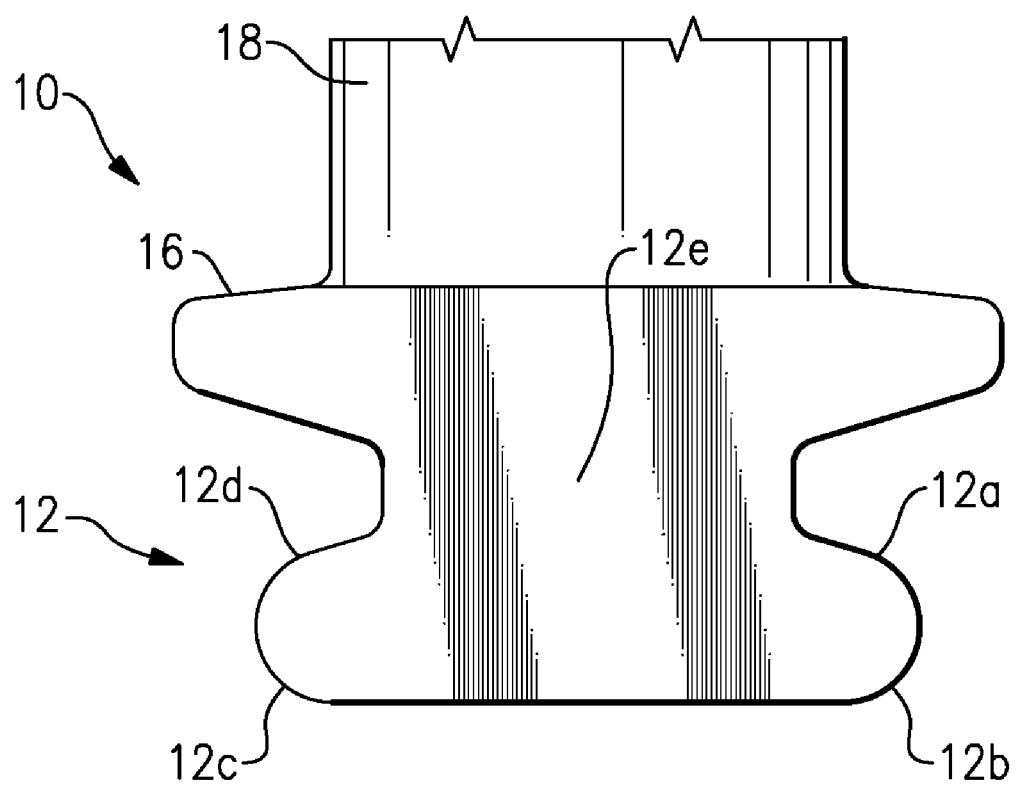
FIG. 7 is a side view of the finished workpiece, such as a dovetail of the turbine blade made of titanium, after undergoing a finish machining operation.

Lastly, the dovetail blank 120 undergoes a finishing operation to form the desired shape of the dovetail 12, as shown in FIG. 7. The finishing operation can be performed using conventional means, such as a grinding or milling process, and the like. In the finishing operation, the sidewalls 120a, 120b of the dovetail blank 120 are machined to form beveled surfaces 12a, 12b, 12c, 12d that are the tangs in the finished dovetail 12. In addition, a notch or groove 12e may be formed at the intersection between the dovetail 12 and the projection 16. Alternatively, the groove 12e can be eliminated in the final dovetail 12. Other finishing operations that are within the scope of the invention include, but are not limited to, lobe radius operations, tumble, and etching.

Although the illustrated embodiments have been described with reference to a dovetail of a turbine blade comprising titanium alloy, the invention is not limited to dovetail machining but rather may be used to machine a variety of workpieces made of any metallic material that is currently machined by grinding, milling, turning, and the like. Some non-limiting examples of which the process of the invention could be used include machining plating for armor applications, turning to make shafts, machining components for heat exchangers, and the like.

As described above, the hybrid electromachining process of the invention uses a high-speed electro-erosion (HSEE) process that applies both electro-erosion and electrochemical machining processes, as well as abrasion to yield combined, synergestic improvement in metal removal rates, as compared to conventional ECG processes that only applies abrasion to remove the oxide layer to promote electrochemical reaction rates.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An apparatus for hybrid machining an electrically-conductive workpiece, comprising:
    a mandrel for supporting an electrically-conductive workpiece;
    a rotating cutter mounted on an arbor, the cutter made of an electrically conductive material with a non-conductive abrasive material dispersed therein;
    a power supply electrically connected to both the electrically-conductive workpiece and the cutter for providing electrical power to both the electrically-conductive workpiece and the cutter; and
    a coolant supply for circulating a coolant between the cutter and the electrically-conductive workpiece,
    wherein the material is removed from the electrically-conductive workpiece using a high-speed electro-erosion process that simultaneously uses electrical erosion, mechanical abrasion, and electrochemical dissolution processes when the cutter is moved relative to the electrically-conductive workpiece in the range between about 3 inches per minute to about 50 inches per minute.

2. An apparatus according to claim 1, wherein the electrically-conductive workpiece comprises a dovetail blank of a turbine blade.

3. An apparatus according to claim 1, wherein the grit range of the non-conductive abrasive material is from about 60 to about 340 grit.

4. An apparatus according to claim 1, wherein the coolant includes one or more additives for increasing electrical discharge between the electrically-conductive workpiece and the cutter.

5. An apparatus according to claim 4, wherein the one or more additive comprises sodium bromide.

6. An apparatus according to claim 1, wherein the cutter further includes a perimeter rim that conforms to a profile of the electrically-conductive workpiece when material is removed therefrom.

7. An apparatus according to claim 1, wherein the power supply provides a DC voltage in a range between about 8 volts to about 22 volts.

8. An apparatus according to claim 1, wherein the electrically-conductive workpiece is made of a titanium alloy.

9. A method of hybrid machining an electrically-conductive workpiece, comprising the steps of:
    rotating a cutter made of an electrically conductive material with a non-conductive abrasive material dispersed therein;
    electrically powering both an electrically-conductive workpiece and the cutter;
    circulating a coolant between the electrically-conductive workpiece and the cutter;
    positioning the electrically-conductive workpiece relative to the cutter at a predetermined depth of cut; and
    moving the cutter relative to the electrically-conductive workpiece in the range between about 3 inches per minute to about 50 inches per minute,
    whereby the material is removed from the electrically-conductive workpiece using a high-speed electro-erosion process that simultaneously uses electrical erosion, mechanical abrasion, and electrochemical dissolution processes.

10. A method according to claim 9, wherein the electrically-conductive workpiece comprises a dovetail blank of a turbine blade.

11. A method according to claim 9, wherein the cutter is moved along a longitudinal axis of the electrically-conductive workpiece to remove material from sidewalls of the electrically-conductive workpiece.

12. A method according to claim 9, wherein the cutter is moved along a longitudinal axis of the electrically-conductive workpiece to remove material from a lower portion of the electrically-conductive workpiece.

13. A method according to claim 9, further comprising the step of performing a finishing operation on the electrically-conductive workpiece to produce a final shape.

14. A method according to claim 9, wherein the cutter and the electrically-conductive workpiece are electrically powered with a DC voltage in a range between about 8 volts to about 22 volts.

15. A method according to claim 9, wherein the electrically-conductive workpiece is made of a titanium alloy.

16. A method of hybrid machining an electrically-conductive workpiece, comprising the steps of:
   rotating a cutter made of an electrically conductive material with a non-conductive abrasive material dispersed therein;
   electrically powering both an electrically-conductive dovetail blank of a turbine blade and the cutter;
   circulating a coolant between the electrically-conductive dovetail blank and the cutter;
   positioning the electrically-conductive dovetail blank relative to the cutter at a first predetermined depth of cut; and
   moving the cutter relative to the electrically-conductive dovetail blank in the range between about 3 inches per minute to about 50 inches per minute to remove material from sidewalls of the electrically-conductive dovetail blank by using a high-speed electro-erosion process that simultaneously uses electrical erosion, mechanical abrasion, and electrochemical dissolution processes.

17. A method according to claim 16, wherein the cutter is moved along a longitudinal axis of the electrically-conductive dovetail blank to remove material from sidewalls of the electrically-conductive dovetail blank using the high-speed electro-erosion process.

18. A method according to claim 16, further comprising the steps of;
   positioning the electrically-conductive dovetail blank relative to the cutter at a second predetermined depth of cut;
   moving the cutter relative to the electrically-conductive dovetail blank to remove material from a lower portion of the electrically-conductive dovetail blank using the high-speed electro-erosion process.

19. A method according to claim 18, wherein the cutter is moved along a longitudinal axis of the electrically-conductive dovetail blank to remove material from a lower portion of the electrically-conductive dovetail blank.

20. A method according to claim 18, further comprising the step of performing a finishing operation on the electrically-conductive dovetail blank to produce a final shape of a dovetail for a turbine blade.

* * * * *